United States Patent Office 3,585,255
Patented June 15, 1971

3,585,255
ELECTRICALLY SUPERIOR POLYESTER FILM CONTAINING POLYSTYRENE OR POLY-IONOMER ADDITIVE POLYMER
Robert J. Sevenich, White Bear Lake, Minn., assignor to Minnesota Mining and Manufacturing Company, St. Paul, Minn.
No Drawing. Filed Sept. 23, 1968, Ser. No. 761,818
Int. Cl. B29g 7/00; C08g 39/10, 51/54
U.S. Cl. 260—873        5 Claims

ABSTRACT OF THE DISCLOSURE

Physically blending minor amounts of polystyrene or polyionomers into polyester resin which is to be extruded into a film and thereafter oriented, imparts unexpectedly superior electrical properties to the ultimate film. The film also displays improved "slip" properties.

BACKGROUND OF THE INVENTION

The invention relates to modified biaxially oriented polyethylene terephthalate film having superior electrical properties.

Any insulating material in an electrical circuit displays both resistive and capacitive characteristics. If a sinusoidal alternating voltage is applied to a perfectly capacitive dielectric, the resulting alternating current having the same period would be 90° out of phase with the applied voltage. If the dielectric is perfectly resistive, the current would be in phase (i.e., 0°) with respect to the applied voltage. Practically speaking, the dielectric phase angle $\theta$ of the resultant current with respect to the voltage will be somewhere between 0° and 90°. The dielectric loss angle $\delta$ is 90°—$\theta$. The dielectric dissipation factor D, or loss tangent, is the tangent of angle $\delta$, representing the ratio of resistive to capacitive current. The lower the value of D, the less power is dissipated as heat and the less the effect on the rest of the electrical network. Whether the material is used as either electrical insulator or capacitor dielectric, D should generally be small.

To achieve the greatest reliability of the electrical network in which it is used, it is important for a low-loss insulating material's dielectric constant and dissipation factor to be as constant as possible throughout the range of operating conditions. In fact, independence of such variables as frequency and ambient temperature is extremely desirable, reducing the necessity of specifically tailoring capacitors, cable wraps, and other insulated electrical circuit components to each individual application and greatly facilitating circuit design.

Although conventional biaxially oriented polyethylene terephthalate film is widely used as an insulating and dielectric material, its dielectric constant and dissipation factor are more dependent on frequency and ambient temperature than is desirable.

Insulating materials are used in general in two distinct ways, (1) to support and insulate components of an electrical network from each other and from ground, and (2) to function as the dielectric of a capacitor. For the first use, it is generally desirable to have the capacitance of the support as small as possible, consistent with acceptable mechanical, chemical, and heat-resisting properties. A low value of dielectric constant is thus desirable. For the second use, it is desirable to have a high value of dielectric constant, so that the capacitor may be physically as small as possible.

The dielectric constant, K, of a material is usually understood to be the ratio of the capacitance of a fixed configuration of electrodes with the material as the dielectric to the capacitance of the same configuration of electrodes with vacuum (or air for most practical purposes) as the dielectric. To illustrate, the following values are typical in the range of 25°–125° C.:

| Frequency, Hz. | K | D×10² |
|---|---|---|
| 100 | 3.52–3.95 | 0.11–1.0 |
| 1,000 | 3.51–3.88 | 0.15–1.3 |
| 10,000 | 3.50–3.79 | 0.32–1.5 |
| 100,000 | 3.45–3.71 | 1.0–1.8 |

The overall values for the range of frequencies and temperatures indicated may be expressed as follows:

K, 3.70±0.255

D×10², 1.0±0.85

It is believed that, prior to the present invention, no way of modifying biaxially oriented polyester film, to reduce the variation in these two electrical characteristics, was known.

SUMMARY

The present invention provides a modified biaxially oriented film which, like the unmodified film, is strong and heat-resistant. Compared to prior art film, however, products made in accordance with the invention possess a dielectric constant which is significantly more independent of frequency and ambient temperature. It is also found that dissipation factors are low. For example, preferred embodiments of the invention may have the following values in the 25°–125° C. and 0.1–100 kHz. range:

K, 3.00±0.07

D×10², 0.60±0.50

The improved characteristics of film made in accordance with the invention greatly enlarge the potential market for polyester film. Capacitors made with the film of this invention can be designed for a wide range of operating conditions while maintaining sufficient accuracy to command a premium price. The constant electrical properties of the film offer advantages as the base for flexible printed circuitry of the type used in computers, or in the manufacture of tape conductor cables. Reduced dissipation factor of these films should also permit the use of less copper in transformers where the film is used as interlayer and intercoil insulation and prove especially valuable in flyback or other high voltage pulse transformers.

In accordance with the invention, minor amounts of polystyrene or polyionomer are blended with polyethylene terephthalate polymer prior to extrusion. The blending can be effected either by introducing the additive polymer into the reaction kettle in which the polyethylene terephthalate has been polymerized or by introducing both the polyester and the additive polymer into the extruder. Depending upon the specific additive polymer, as low as 2% has proved effective, the upper limit of additive being determined largely by considerations of convenience, economics, and loss of those physical characteristics for which polyethylene terephthalate is outstanding. Generally speaking, there appears to be no particular advantage to adding more than about 15% foreign polymer, although the improvements offered by the invention may be realized with even greater amounts, e.g., up to 30% or more.

Surprisingly, blended films prepared in the manner just described synergistically retain good features of both the polyester and the additive polymer, rather than (as would normally be supposed) merely displaying characteristics which could be predicted from the relative percentages of the two polymers.

When examined under the electron microscope, films formed from polymer blends are seen to consist of elongated globules of additive polymer embedded in the polyester. The thickness of the globules ranges from 0.1 to 0.5μ and the width and length dimensions range from 0.25 to 6.5μ or larger. No voids are seen around the platelets, a fact which is somewhat surprising in view of the incompatibility of the polyester and additive polymers, as evidenced by the fact that if they are fused in a test tube, they separate into distinct layers. Polyester polymer which is to be made into film conventionally includes small particles of an inorganic "slip agent" to facilitate unwinding of the roll, prevent blocking, and otherwise facilitate handling. These inorganic inclusions tend to cause minor variations in caliper of the film formed therefrom, the quality which is particularly disconcerting in the manufacture of such products as video tape, where "dropouts" often occur. Biaxially oriented film formed in accordance with the present invention, omitting any inorganic slip agent, is more uniform in caliper than films containing conventional inorganic slip agents. As a result, magnetic recording tape and other film products made therefrom cannot only be subjected to more severe stress and flexing but also can be manufactured with less waste and used with little or no scratching, seizing or blocking. For this purpose, as little as ¼% of the additive polymer additive is effective.

DESCRIPTION OF PRESENTLY PREFERRED EMBODIMENTS

The invention will be better understood by reference to the following illustrative but nonlimiting examples, in which all parts are by weight unless otherwise noted.

In a stainless steel reactor equipped with the distillation column and an agitator, 62 parts of dimethyl terephthalate is transesterified with 44 parts of ethylene glycol, in the presence of 0.018% zinc acetate and 0.025% antimony trioxide. After removing the methanol which is evolved in the reaction, the reaction mixture is raised to 250° C., for 32 minutes, at the end of which time 95% of the theoretical excess of ethylene glycol has been distilled and collected. The vessel is then opened and 3 parts of additive polymer pellets introduced, after which the vessel is resealed and the contents stirred for 5–10 minutes while purging with an inert gas. A vacuum is slowly applied as the prepolymer is rapidly stirred and gradually heated to 280° C. Heating and stirring were continued for one hour after a pressure of 0.5 mm. Hg is obtained. The liquid polymer blend is removed from the vessel, allowed to cool and solidify, and then broken into small chunks for subsequent extrusion. The blend is then extruded in a 10-mil sheet, biaxially oriented to a thickness of about 1 mil, and subjected to a series of physical tests and electrical tests of the type previously described. Because of its tendency to degrade at the temperatures described in the foregoing paragraph, polystyrene is not generally added to polyester by kettle blending.

Examples 1–5

Polyethylene terephthalate pellets were introduced into the hopper of a conventional film extruder which had been modified by tapping the feed zone to attach a second extruder. Polystyrene pellets were introduced into the second extruder, and the feed rates of the two extruders adjusted to provide a family of 5–10 mil polyester:polystyrene blended films. These films were then biaxially oriented to a thickness of ½–1 mil and subjected to electrical tests at various temperatures and frequencies; results are tabulated below:

| Example | Blend composition Polyester | Polystyrene | Frequency, Hz. | Dielectric constant, K at— 25° C. | 50° C. | 75° C. | 105° C. | 125° C. | 150° C. | Dissipation factor, D×10² at— 25° C. | 50° C. | 75° C. | 105° C. | 125° C. | 150° C. | Dielectric strength, kr./ml. | Tensile strength, p.s.i. | Percent elongation at break | M.P., °C. |
|---|---|---|---|---|---|---|---|---|---|---|---|---|---|---|---|---|---|---|---|
| Control | 100 | 0 | 100 | 3.58 | 3.55 | 3.52 | 3.74 | 3.95 | 3.99 | 0.20 | 0.11 | 0.15 | 1.5 | 1.0 | 0.83 | 8.8 | 30,000 | 100 | 255–260 |
| 1 | 98 | 2 | | 3.65 | 3.64 | 3.62 | 3.70 | 3.85 | | 0.22 | 0.13 | 0.16 | 0.97 | 1.2 | | | 31,000 | 110 | |
| 2 | 95 | 5 | | 3.53 | 3.50 | 3.50 | 3.56 | 3.70 | | 0.21 | 0.12 | 0.17 | 0.77 | 1.2 | | | 33,100 | 126 | |
| 3 | 92 | 8 | | 3.39 | 3.35 | 3.34 | 3.39 | 3.52 | | 0.21 | 0.11 | 0.16 | 1.0 | 1.0 | | | 31,000 | 123 | |
| 4 | 90 | 10 | | 2.75 | 2.72 | 2.71 | 2.72 | 2.82 | 2.85 | 0.14 | 0.08 | 0.10 | 0.60 | 0.84 | 0.36 | 7.1 | 28,100 | 109 | |
| | 70 | 30 | | 3.02 | 3.00 | 2.96 | 3.01 | 3.07 | 3.12 | 0.13 | 0.09 | 0.10 | 0.86 | 0.88 | 1.2 | | 23,000 | 95 | 240–245 |
| 5 | 0 | 100 | | 2.72 | 2.74 | 2.66 | | | | 0.01 | 0.02 | 0.04 | | | | 25 | 7–12,000 | 20 | 110 |
| Control | 100 | 0 | 1,000 | 3.57 | 3.54 | 3.51 | 3.66 | 3.88 | 3.95 | 0.49 | 0.20 | 0.15 | 1.2 | 1.3 | 0.67 | | | | |
| 1 | 98 | 2 | | 3.63 | 3.64 | 3.65 | 3.77 | | | 0.54 | 0.22 | 0.18 | 0.68 | 1.3 | | | | | |
| 2 | 95 | 5 | | 3.52 | 3.49 | 3.49 | 3.51 | 3.63 | | 0.52 | 0.51 | 0.19 | 0.76 | 1.3 | | | | | |
| 3 | 92 | 8 | | 3.38 | 3.34 | 3.33 | 3.53 | 3.45 | | 0.52 | 0.19 | 0.15 | 0.72 | 1.2 | | | | | |
| 4 | 90 | 10 | | 2.74 | 2.71 | 2.71 | 2.70 | 2.78 | 2.84 | 0.34 | 0.14 | 0.11 | 0.43 | 0.93 | 0.42 | | | | |
| | 70 | 30 | | 3.01 | 2.99 | 2.96 | 2.98 | 3.02 | 3.11 | 0.32 | 0.15 | 0.10 | 0.67 | 0.98 | 0.55 | | | | |
| 5 | 0 | 100 | | 2.72 | 2.74 | 2.65 | | | | 0.01 | 0.03 | 0.03 | | | | | | | |

| Example | Blend composition Polyester | Polystyrene | Frequency, Hz. | Dielectric constant, K at— 25° C. | 50° C. | 75° C. | 105° C. | 125° C. | 150° C. | Dissipation factor, D×10² at— 25° C. | 50° C. | 75° C. | 105° C. | 125° C. | 150° C. |
|---|---|---|---|---|---|---|---|---|---|---|---|---|---|---|---|
| Control | 100 | 0 | 10,000 | 3.52 | 3.52 | 3.50 | 3.60 | 3.79 | 3.91 | 1.0 | 0.54 | 0.32 | 0.88 | 1.5 | 0.94 |
| 1 | 98 | 2 | | 3.60 | 3.62 | 3.61 | 3.62 | 3.70 | | 1.1 | 0.58 | 0.36 | 0.55 | 1.3 | |
| 2 | 95 | 5 | | 3.48 | 3.48 | 3.48 | 3.48 | 3.56 | | 1.1 | 0.51 | 0.32 | 0.60 | 1.3 | |
| 3 | 92 | 8 | | 3.34 | 3.33 | 3.32 | 3.32 | 3.39 | | 1.1 | 0.49 | 0.30 | 0.56 | 1.2 | |
| 4 | 90 | 10 | | 2.72 | 2.71 | 2.70 | 2.69 | 2.74 | 2.81 | 0.69 | 0.37 | 0.21 | 0.32 | 0.87 | 0.63 |
| | 70 | 30 | | 2.99 | 2.97 | 2.96 | 2.95 | 2.98 | 3.08 | 0.67 | 0.37 | 0.20 | 0.52 | 0.93 | 0.67 |
| 5 | 100 | 100 | | 2.72 | 2.74 | 2.65 | | | | 0.01 | 0.07 | 0.05 | | | |
| Control | 100 | 0 | 100,000 | 3.45 | 3.48 | 3.48 | 3.56 | 3.71 | 3.81 | 1.7 | 1.4 | 1.1 | 1.0 | 1.8 | 1.6 |
| 1 | 98 | 2 | | 3.52 | 3.58 | 3.58 | 3.59 | 3.64 | | 2.2 | 1.6 | 0.99 | 0.81 | 1.3 | |
| 2 | 95 | 5 | | 3.41 | 3.44 | 3.45 | 3.44 | 3.49 | | 1.8 | 1.2 | 0.77 | 0.81 | 1.3 | |
| 3 | 92 | 8 | | 3.28 | 3.28 | 3.30 | 3.29 | 3.33 | | 2.1 | 1.2 | 0.80 | 0.75 | 1.2 | |
| 4 | 90 | 10 | | 2.69 | 2.69 | 2.69 | 2.68 | 2.71 | 2.79 | 1.1 | 0.81 | 0.57 | 0.48 | 0.85 | 1.0 |
| | 70 | 30 | | 2.95 | 2.96 | 2.94 | 2.93 | 2.94 | 3.05 | 1.1 | 0.80 | 0.53 | 0.55 | 0.87 | 0.98 |
| 5 | 100 | 100 | | 2.72 | 2.74 | 2.65 | | | | <0.01 | 0.18 | 0.29 | | | |

Although polystyrene film has good electrical properties, its low tensile strength and heat resistance severely limit its application in the electrical market place. In fact, at temperatures much above 100° C. the film is unusable in electrical applications. Fortunately, however, films formed from polyester-polystyrene blends in accordance with the invention are able to function at temperatures as high as 150° C. for extended periods.

At concentrations up to 30% the blended film is orientable up to 3 fold in the length and the width directions. Above this concentration it becomes increasingly difficult to orient the film to this extent and the physical properties begin to drop off.

The kettle blending technique affords the maximum amount of mixing for the dissimilar polymers and yet can be accomplished with a minimum of equipment. "Hold-up" in the recesses of the kettles and the lengthy clean-up times required to remove two different polymers from the same piece of equipment, however, are distinct drawbacks in comparison to the following procedures.

Polymer blends for use in making films can alternatively be prepared by grinding polyethylene terephthalate polymer into small chunks, adding the secondary polymer pellets thereto, and stirring, shaking, or otherwise agitating the blend to produce uniform dispersion. The mixture is then dried to remove any water picked up from the atmosphere, extruded as film and the film then biaxially oriented. Blends containing relatively high percentages of additive polymer (e.g., 30%) can be prepared in this way more readily than by adding it directly to the polyethylene terephthalate kettle, which might lack the necessary capacity.

The preferred way to prepare polymer blends in accordance with the present invention is to "tap" the barrel or feed zone of an extruder used for preparation of polyethylene terephthalate film, attaching a second extruder at this location to permit feeding the second polymer into the barrel. This method combines the advantages of rapid and intimate mixing in the extruder screw, simplicity and greatly reduced possibility of any detrimental interaction between the two polymers.

Example 6

Blends of 70% polyethylene terephthalate and 30% polyionomer (commercially available from E. I. du Pont de Nemours under the registered trademark designation "Surlyn A" 1650) were prepared in an extruder, extruded in a 10-mil sheet, biaxially oriented to a thickness of about 1 mil, and tested as in previous examples. Results are tabulated below:

dielectric constant. A comparison of the predicted and actual results is shown below:

| Film | K values for 100 Hz. at 125° C. | | |
|---|---|---|---|
| | Predicted for series | Predicted for parallel | Actual value |
| 100% PET | | | 3.95 |
| 100% polystyrene | | | (¹) |
| 100% polyionomer | | | 2.72 |
| 30% polystyrene | | | 3.07 |
| 30% polyionomer | 3.46 | 3.58 | 2.95 |

¹ Film melts.

| Film | K values for 100 kHz. at 50° C. | | |
|---|---|---|---|
| | Predicted for series | Predicted for parallel | Actual value |
| 100% PET | | | 3.48 |
| 100% polystyrene | | | 2.74 |
| 100% polyionomer | | | 2.31 |
| 30% polystyrene | 3.21 | 3.26 | 2.96 |
| 30% polyionomer | 3.01 | 3.13 | 3.04 |

At the higher temperatures the synergistic effect is more apparent and the desired flattening of the curve of dielectric constant vs. temperature makes the blended film very dependable in its response and therefore much more useful.

| Percent | | Frequency, Hz. | Dielectric constant, K at— | | | | | | Dissipation factor, D×10² at— | | | | | |
|---|---|---|---|---|---|---|---|---|---|---|---|---|---|---|
| Polyester | Additive | | 25° C. | 50° C. | 75° C. | 100° C. | 125° C. | 150° C. | 25° C. | 50° C. | 75° C. | 100° C. | 125° C. | 150° C. |
| 70 | 30 | 100 | 3.11 | 3.09 | 3.03 | 2.90 | 2.95 | 2.97 | 0.20 | 0.21 | 0.16 | 0.62 | 0.54 | 0.53 |
| | | 1,000 | 3.10 | 3.08 | 3.02 | 2.87 | 2.93 | 2.96 | 0.32 | 0.28 | 0.18 | 0.51 | 0.64 | 0.37 |
| | | 10,000 | 3.08 | 3.07 | 3.02 | 2.85 | 2.92 | 2.94 | 0.57 | 0.46 | 0.28 | 0.41 | 0.69 | 0.46 |
| | | 100,000 | 3.05 | 3.04 | 3.00 | 2.84 | 2.89 | 2.92 | 0.84 | 0.77 | 0.57 | 0.47 | 0.73 | 0.65 |
| 0 | ¹100 | 100 | 2.56 | 2.54 | 2.30 | 2.54 | 2.28 | (²) | 0.29 | 0.37 | 0.32 | 0.18 | 0.12 | (²) |
| | | 1,000 | 2.54 | 2.51 | 2.26 | 2.51 | 2.28 | (²) | 0.36 | 0.41 | 0.44 | 0.31 | 0.20 | (²) |
| | | 10,000 | 2.53 | 2.49 | 2.26 | 2.49 | 2.27 | (²) | 0.29 | 0.46 | 0.60 | 0.50 | 0.36 | (²) |
| | | 100,000 | 2.52 | 2.46 | 2.25 | 2.46 | 2.25 | (²) | 0.36 | 0.49 | 0.71 | 0.75 | 0.63 | (²) |

¹ 7.61 mil pressed film. ² Melts.

As can be seen from the above figures, the dielectric constant and dissipation factor for polyionomer film are fairly constant up to 100° C. but rise dramatically as the ambient temperature nears 125° C.; by 150° C. the polyionomer film has melted. Surprisingly, however, a biaxially oriented film formed from a 30:70 polyionomer: polyester blend displays electrical values at 150° C. comparable to those obtained at 125° C. The electrical properties of this blended film are also far more independent of temperature and frequency than those of unmodified polyester film.

The polyionomers, or ionomer resins, are a class of polyolefins having pendant carboxylate groups associated with monovalent and sometimes divalent cations. The "Surlyn A" ionomers have a melt index in the range of 0.3–10.0, a tensile strength of 3500–5500 p.s.i., an ultimate elongation of 300–400% and a brittleness temperature of less than —160° C. Surlyn A ionomers are ethylene-ethylenically unsaturated carboxylic acid copolymer ionomer resins.

It is recognized that others have previously blended polyethylene terephthalate with polystyrene (see, e.g., U.S. Patent 3,359,344 and British Patent 1,064,239) and poly(4-methyl pentene) (see U.S. Patent 3,361,848), but it is believed that no such blends have been formed into biaxially oriented films. The patentees do not allude to improved electrical properties and, indeed, the electrical utility of polyester resin as an insulator per se lies essentially only in the form of oriented film.

In considering the type of blending which must occur in the mixed polymer system an analysis of the dielectric properties shows that in most cases neither a series nor a parallel model fit the data. A synergistic effect is occurring in some instances which gives lower than expected

I claim:
1. A biaxially oriented film characterized by good heat resistance and tensile strength, together with reduced dissipation factor and unusually uniform and predictable dielectric constant over a wide range of frequencies and temperatures, said film being formed from a visually uniform blend of a major portion of polyethylene terephthalate polymer and an effective minor amount, from about 2% to about 30% by weight, of an additive polymer selected from the group consisting of polystyrene and an ethylene-ethylenically unsaturated carboxylic acid copolymer, polyionomer, said additive polymer being distributed throughout said film in the form of discrete microscopic particles.

2. The film of claim 1, wherein the additive polymer is present in an amount equal to 2 to 20 weight percent.

3. The film of claim 2 wherein the polymeric additive is polystyrene.

4. The film of claim 2 wherein the additive polymer is polyionomer.

5. The film of claim 1, wherein the microscopic particles are in the form of platelets.

References Cited

UNITED STATES PATENTS

| 3,290,411 | 12/1966 | Tsuji et al. | 260—873 |
| 3,359,344 | 12/1967 | Fukushima | 260—873 |
| 3,432,591 | 3/1969 | Heffelfinger | 264—289 |
| 3,435,093 | 3/1969 | Cope | 260—873 |
| 3,313,870 | 4/1967 | Yazawa | 264—290 |
| Re. 26,928 | 2/1966 | Miller et al. | 264—289 |

(Other references on following page)

FOREIGN PATENTS

| | | | |
|---|---|---|---|
| 683,041 | 3/1964 | Canada | 264—289 |
| 1,366,373 | 6/1964 | France | 260—873 |
| 1,182,820 | 7/1965 | Germany | 260—873 |
| 17,769 | 12/1965 | Japan | 264—289 |
| 6511744 | 2/1967 | Netherlands | 260—873 |
| 1,539,880 | 8/1968 | France | 260—873 |

OTHER REFERENCES

Chem. Abst., vol. 52: 7759f, Andrianov et al., "Elec. Ins. . . . Resins," 1956.

Chem Abst., vol. 55: 6152h, Spokas, "Electric Charge . . . Films," 1960.

Chem. Abst., vol. 62: 4172a, Siggel et al., "Modified Polyester . . . Molding," 1965.

Chem. Abst., vol. 68: 60005u, Ward et al., "Viscoelastic . . . Ionomers" (1967).

Modern Plastics, September 1964, vol. 42: "Ionomer: A New Thermoplastic"; "Chemistry of Surlyn A Ionomers" (Rees), pp. 98–99 and 209–210.

Modern Plastics, March 1965, vol. 42: "Ionic Ethylene Interpolymers," Bonotto et al., pp. 135–137, 140 and 198.

WILLIAM H. SHORT, Primary Examiner

E. WOODBERRY, Assistant Examiner

U.S. Cl. X.R.

260—45.7; 264—289